United States Patent
Klaußner et al.

(10) Patent No.: US 12,384,106 B2
(45) Date of Patent: Aug. 12, 2025

(54) APPARATUS FOR ADDITIVELY MANUFACTURING THREE-DIMENSIONAL OBJECTS

(71) Applicant: CONCEPT LASER GMBH, Lichtenfels (DE)

(72) Inventors: Tim Klaußner, Kronach (DE); Fabian Zeulner, Lichtenfels (DE)

(73) Assignee: Concept Laser GmbH, Lichtenfels (DE)

( * ) Notice: Subject to any disclaimer, the term of this patent is extended or adjusted under 35 U.S.C. 154(b) by 1466 days.

(21) Appl. No.: 16/290,961

(22) Filed: Mar. 4, 2019

(65) Prior Publication Data

US 2020/0061925 A1  Feb. 27, 2020

(30) Foreign Application Priority Data

Aug. 22, 2018 (EP) ..................... 18190313

(51) Int. Cl.
*B29C 64/153* (2017.01)
*B22F 10/28* (2021.01)
(Continued)

(52) U.S. Cl.
CPC ............ *B29C 64/153* (2017.08); *B22F 10/28* (2021.01); *B22F 10/36* (2021.01); *B22F 12/90* (2021.01); *B29C 64/268* (2017.08); *B29C 64/277* (2017.08); *B29C 64/393* (2017.08); *B22F 10/31* (2021.01); *B22F 12/44* (2021.01); *B22F 2201/11* (2013.01); *B29C 64/371* (2017.08);

(Continued)

(58) Field of Classification Search
CPC ... B29C 64/153; B29C 64/386; B29C 64/393; B33Y 50/00; B33Y 50/02
See application file for complete search history.

(56) References Cited

U.S. PATENT DOCUMENTS

2009/0206065 A1  8/2009  Kruth et al.
2010/0296106 A1  11/2010  Gates et al.
(Continued)

FOREIGN PATENT DOCUMENTS

DE  102017202725 B3  7/2018
EP  2032345 A1  3/2009
(Continued)

OTHER PUBLICATIONS

Machine translation of WO2018087256, May 2018, Allenberg-Rabe.*
European Search Report Corresponding to Application No. 18190313 on Jan. 28, 2019.

*Primary Examiner* — Philip C Tucker
*Assistant Examiner* — Jimmy R Smith, Jr.
(74) *Attorney, Agent, or Firm* — Wood Herron & Evans LLP

(57) ABSTRACT

Apparatus (11) for additively manufacturing three-dimensional objects (2) by means of successive layerwise selective irradiation and consolidation of layers of a build material (19) which can be consolidated by means of an energy source, wherein a position determination device (1) is provided that is adapted to determine position data relating to a position of at least one part (3) of at least one object (2) based on a detection of a reflected part (8) of an energy beam (16) or a measurement beam (5) that is reflected at the at least one part (3) of the at least one object (2).

11 Claims, 3 Drawing Sheets

Figure 1:
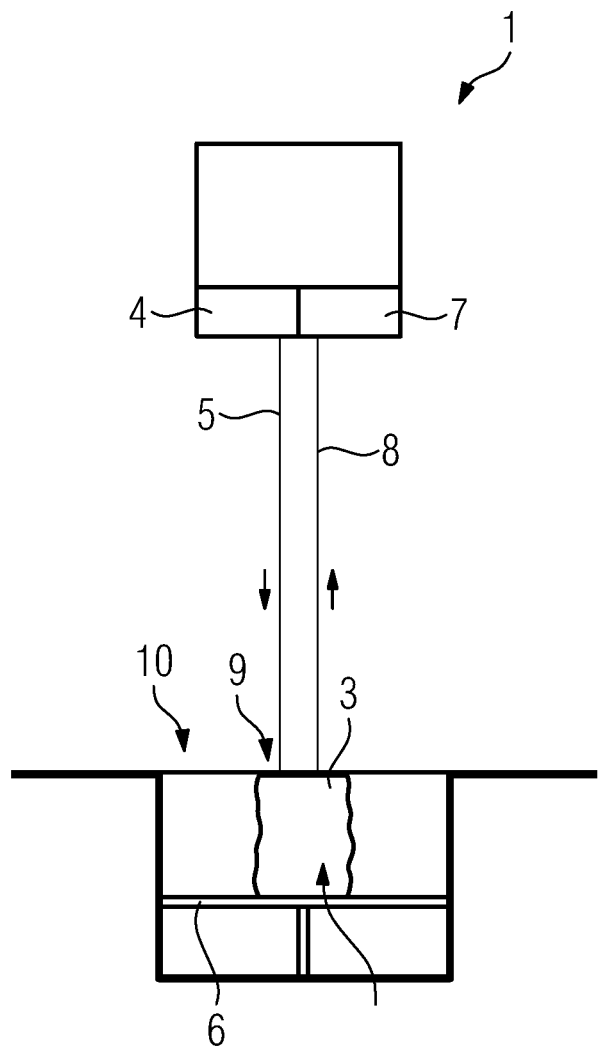

(51) Int. Cl.
*B22F 10/36* (2021.01)
*B22F 12/90* (2021.01)
*B29C 64/268* (2017.01)
*B29C 64/277* (2017.01)
*B29C 64/393* (2017.01)
*B33Y 50/02* (2015.01)
*B22F 10/31* (2021.01)
*B22F 12/44* (2021.01)
*B29C 64/371* (2017.01)
*B33Y 10/00* (2015.01)
*B33Y 30/00* (2015.01)

(52) U.S. Cl.
CPC ............... *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 2015/0037599 A1* | 2/2015 | Blackmore | B33Y 50/02 428/548 |
| 2016/0023403 A1* | 1/2016 | Ramos | B33Y 10/00 425/171 |
| 2017/0030497 A1 | 2/2017 | Bai et al. | |
| 2017/0239719 A1* | 8/2017 | Buller | B22F 12/49 |
| 2018/0093416 A1* | 4/2018 | Prexler | B33Y 10/00 |
| 2018/0186067 A1* | 7/2018 | Buller | B22F 12/44 |

FOREIGN PATENT DOCUMENTS

| | | |
|---|---|---|
| EP | 3219411 A1 | 9/2017 |
| WO | 2007147221 A1 | 12/2007 |
| WO | 2009048808 A1 | 4/2009 |
| WO | WO-2018087256 A1 * 5/2018 | ............. B22F 10/28 |

* cited by examiner

APPARATUS FOR ADDITIVELY MANUFACTURING THREE-DIMENSIONAL OBJECTS

CROSS-REFERENCE TO RELATED APPLICATIONS

This application claims priority to European Patent Application serial no. 18 190 313.9 filed Aug. 22, 2018, the contents of which is incorporated herein by reference in its entirety as if set forth verbatim.

The invention relates to an apparatus for additively manufacturing three-dimensional objects by means of successive layerwise selective irradiation and consolidation of layers of a build material which can be consolidated by means of an energy source.

Apparatuses for additively manufacturing of three-dimensional objects, for example by successively selectively irradiating layers of a build material with an energy source, e.g. a laser beam or an electron beam, to consolidate the build material and thereby build the three-dimensional object, are generally known from prior art. In addition to additive manufacturing processes, in which the object is entirely built in one process from (powdery) build material, manufacturing processes are known in which a part of an object is additively built onto an already existing part. Those processes are, for example, called "hybrid" processes, wherein an already manufactured part of the object, such as a base body, is inserted into the process chamber of an additive manufacturing apparatus, wherein at least one other part of the object is additively manufactured, i.e. successively layerwise built, onto the previously manufactured part.

In both alternatives it is known that it is crucial that the position of the object (previously manufactured part or previously consolidated layer) is arranged in a nominal position. If deviations from a nominal position of the object (and the powder bed) occur, the irradiation pattern generated on the uppermost layer of build material to consolidate the build material is misaligned and therefore, imperfections in the object may occur.

Usually, the actual position of the previously manufactured part of the object (e.g. a base body) on a carrying element of the apparatus is manually determined and the part is manually aligned. This determination and calibration process is time-consuming and cumbersome, as an operator of the apparatus or service personnel has to determine the object position and has to position the previously manufactured part of the object on the carrying element into a defined nominal position. After the object is positioned, the position is preferably verified by another measurement or determination of the position.

It is an object of the invention to provide an apparatus for additively manufacturing three-dimensional objects, wherein the determination of position data of the at least one part of at least one object is improved.

The object is inventively achieved by an apparatus according to claim 1. Advantageous embodiments of the invention are subject to the dependent claims.

The apparatus described herein is an apparatus for additively manufacturing three-dimensional objects, e.g. technical components, by means of successive selective layerwise consolidation of layers of a powdered build material ("build material") which can be consolidated by means of an energy source, e.g. an energy beam, in particular a laser beam or an electron beam. A respective build material can be a metal, ceramic or polymer powder. A respective energy beam can be a laser beam or an electron beam. A respective apparatus can be an apparatus in which an application of build material and a consolidation of build material is performed separately, such as a selective laser sintering apparatus, a selective laser melting apparatus or a selective electron beam melting apparatus, for instance. Alternatively, the successive layerwise selective consolidation of build material may be performed via at least one binding material. The binding material may be applied with a corresponding application unit and, for example, irradiated with a suitable energy source, e.g. a UV light source.

The apparatus may comprise a number of functional units which are used during its operation. Exemplary functional units are a process chamber, an irradiation device which is adapted to selectively irradiate a build material layer disposed in the process chamber with at least one energy beam, and a stream generating device which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

As described before, the invention relates to additive manufacturing apparatuses via which hybrid processes and regular additive manufacturing processes can be performed, i.e. processes in which at least one part of the object is additively built onto a previously manufactured part of the object and processes in which the three-dimensional object is entirely additively built from build material in one (or more) additive manufacturing process step(s). To consolidate the build material in the additive manufacturing process performed via the inventive apparatus an energy source is used. As described before, the energy source may be any type of energy source that is suitable to ensure that a proper consolidation of the build material is achieved. In particular, the energy source may be an energy beam, such as a laser beam or an electron beam that can selectively be guided onto the surface of build material, i.e. the build plane.

Thus, if the term "energy beam" is used during this application, a "writing beam" is addressed, i.e. an energy beam generated via an irradiation device that can be selectively guided over the surface of build material to deplete energy in the build material to selectively consolidate the build material to build the three-dimensional object. In other words, the term "energy beam" addresses the energy beam used to consolidate the build material and also used to determine the position data, wherein a beam (exclusively) used to determine the position data will be referred to as "measurement beam", as will be described below.

The invention is based on the idea that a position determination device is provided that is adapted to determine position data relating to a position of at least one part of at least one object based on a detection of a reflected part of an energy beam or a reflected part of a measurement beam that is reflected at the at least one part of the at least one object. Hence, as described before, the term "energy beam" relates to the energy source that is used to selectively consolidate the build material, whereas the term "measurement beam" refers to an additional beam (additional to the energy source) that can be selectively guided over the carrying element carrying the object, typically in the process chamber (chamber in which the additive manufacturing process is performed). Therefore, the energy beam may be used to irradiate build material and/or to determine the position data.

Alternatively, an energy source (e.g. an energy beam) is used to irradiate build material and a (separate) measurement beam is used to determine the position data.

For example, the measurement beam is also an energy beam, such as a laser beam or an electron beam, wherein the measurement beam may be separately generated. Thus, an irradiation device may be provided generating the energy beam to selectively irradiate the build material, whereas a separate measurement beam source may be provided for generating the measurement beam to generate a corresponding signal to be used to determine the position data via the position determination device, as will be described below.

According to the invention, the position data are determined via a position determination device. The position data relate to a position of at least one part of at least one object, e.g. on a carrying element, in particular in a process chamber of a module or the apparatus. Thus, the position data may indicate a position of a previously manufactured (or provided) part of an object, in particular for a hybrid process. The position data may also indicate a position of a previously consolidated layer of build material in any arbitrary additive manufacturing process. Hence, the position data may indicate the position of a part of an object, for example relative to a carrying element that carries the at least one part of the object or parts of multiple objects, e.g. in manufacturing multiple objects simultaneously or one object from multiple parts.

The determination of the position data is performed based on the detection of a reflected part of the energy beam or a reflected part of the measurement beam which is reflected at the at least one part of the at least one object. Thus, the energy beam or the measurement beam is guided to the at least one part of the at least one object, e.g. scanned over the carrying element, wherein the energy beam or the measurement beam is (at least partially) reflected at a surface of the at least one part. The reflection properties of the measurement beam or the energy beam at the surface of the part typically and preferably differs from the structure surrounding the part, such as a carrying element carrying the part or build material surrounding the part, e.g. if the part is received in a powder bed, e.g. in terms of the reflectivity of the part and the structure surrounding the part.

In other words, it is possible to guide the energy beam or the measurement beam over the structure (e.g. carrying element) that carries the part or on which the part is positioned, respectively, wherein the reflected measurement beam or the reflected energy beam can be detected. Thus, a relation between the position of the spot of the energy beam or the measurement beam and the detection of the reflected part of the energy beam or the measurement beam can be established to relate the object position to the detection of the reflected part. Thus, if the reflected part is detected (with defined reflection properties, e.g. intensity), the actual position of the (spot of) the measurement beam or the energy beam is on the at least one part of the object.

According to a preferred embodiment of the inventive apparatus, the position determination device may comprise a detection unit, in particular a photo diode and/or a camera, that is adapted to detect the reflected part of the energy beam or the reflected part of the measurement beam. The detection unit may for example be deemed as functional part of the determination device or of the apparatus. The detection unit may also be provided for determining at least one parameter of radiation propagating in the process chamber in a regular additive manufacturing process, such as the determination of at least one parameter of the energy beam, which is reflected at a surface of build material during the additive manufacturing process. It is also possible to use the detection unit in regular additive manufacturing processes to determine at least one parameter of thermal radiation emitted from the build material arranged in the build plane, in particular related to the melt pool, i.e. a region of build material in the build plane directly irradiated via the energy beam to consolidate build material.

The detection unit comprises means for detecting the reflected part of the energy beam or the reflected part of the measurement beam, wherein a suitable detection element of the detection unit may be built as photo diode and/or camera that is adapted to detect radiation. The detection unit may further comprise a beam splitter, wherein the beam splitter is adapted to guide the reflected part of the energy beam or the reflected part of the measurement beam emitted from the object, i.e. reflected at the (part of the) object, towards the detection unit, in particular towards the detection element of the detection unit. The energy beam and/or the measurement beam may also be reflected at the beam splitter in that the reflected part of the energy beam or the reflected part of the measurement beam may be guided in line with the energy beam or the measurement beam.

Further, an irradiation device may be adapted to generate the energy beam for selectively irradiating a layer of build material in the build plane, wherein the detection unit may be adapted to detect the reflected part of the energy beam or an irradiation device and a measurement beam source may be provided, wherein the irradiation device is adapted to generate the energy beam for selectively irradiating build material in the build plane (or any other arbitrary energy source) and the measurement beam source may be adapted to generate a measurement beam, wherein the detection unit may be adapted to detect a reflected part of the measurement beam that is reflected at the at least one part of the at least one object.

Thus, this embodiment describes two alternatives, wherein according to a first alternative an irradiation device is provided that is adapted to generate an energy source, e.g. an energy beam. The energy beam is used for selectively irradiating the build material in the additive manufacturing process and for determining the position data, e.g. in a "measurement mode". Thus, in the additive manufacturing process the energy beam is used to selectively irradiate the build material, whereas in the measurement mode the energy beam may be guided over the build plane or over the carrying element, i.e. in a process chamber of the apparatus and the reflected part of the energy beam can be detected to determine the position data.

The other alternative comprised in this embodiment suggests that additional to the irradiation device that generates the energy beam, a measurement beam source is provided. Hence, the irradiation device generates the energy source, in particular an energy beam, which is exclusively used to irradiate the build material in the additive manufacturing process. The measurement beam is exclusively used to be guided over the build plane or to be guided over the carrying element, wherein the reflected part of the measurement beam can be detected via the detection unit. Thus, position data relating to the position of the at least one part of the at least one object can be determined by detecting the reflected part of the measurement beam. In particular, the reflected part of the energy beam or the reflected part of the measurement beam indicate the position(s) in which the at least one part of the at least one object is positioned, as the respective reflected part of the energy beam or the reflected part of the measurement beam is only reflected (at least with different parameters than being incident on the build material or the carrying element), if it is incident on the at least one part of the at least one object.

According to another embodiment of the inventive apparatus, the irradiation device may be adapted to generate the energy beam used for selectively irradiating build material with at least two different irradiation parameters, preferably different wavelengths and/or focal positions and/or beam powers and/or spot sizes and/or scan speeds and/or intensities, wherein preferably at least one intensity is lower than an intensity used in the additive manufacturing process, in particular a determination intensity used to determine the position data. In other words, as described before, by using the energy beam, which is generated via the irradiation device, for the determination of the position data, a "measurement mode" may be provided, in which at least one parameter of the energy beam can be adjusted and/or changed in comparison to the same parameter used, if the energy beam is used in the additive manufacturing process to selectively irradiate a build material. Hence, it is possible to use different irradiation parameters, e.g. at least one different irradiation parameter in the "measurement mode" than in a regular mode of operation. For example, it is possible that the measurement beam comprises different irradiation parameters, in particular different intensity and different wavelength, than the energy beam used to irradiate build material.

Thus, it is particularly possible that in such a "measurement mode" the intensity of the energy beam is chosen differently, in particular lower than in an additive manufacturing process. Thus, the irradiation device may generate a lower powered energy beam or an energy beam with a lower intensity for the determination process for determining the position data. Thus, the energy beam in the measurement mode may be generated with an intensity ("determination intensity") that is suitable for generating a proper reflected part of the energy beam that can be detected via the detection unit, as described before. The intensity in the measurement mode, i.e. the determination intensity, may be chosen or defined in that the energy depleted in the at least one part of the object and/or in the build material is not sufficient to significantly heat the build material and/or the part of the object, in particular not sufficient to melt or to sinter the build material and/or the part of the object. Accordingly, if the energy beam is scanned over the build material or the object in the measurement mode or with the determination intensity, respectively, only the reflected part of the energy beam can be detected and no significant influences (i.e., consolidating, in particular melting or sintering) on the build material and/or the at least one part of the at least one object occur.

Further, it is possible to choose a focal position of the energy beam in the measurement mode in that the focal position is arranged on the uppermost (top) surface of the at least one part of the at least one object. Thus, the reflected part of the energy beam is reflected as it is incident on the object. If the energy beam is not incident on the object, but on another surface, the energy beam is incident defocused on that surface, e.g. the carrying element. Thus, the signal that can be detected via the detection unit, in particular the reflected part of the energy beam, can also be distinguished by the intensity of the reflected part of the energy beam. As the energy beam is reflected at the at least one part of the at least one object with a much higher intensity, as the energy beam is focused onto the at least one part of the at least one object, the intensity of the reflected part of the energy beam being incident on the object differs from a reflected part of the energy beam not being incident on the object. Hence, position data can be acquired accordingly. Of course, the described measurement mode with the focal position being positioned on the uppermost surface of the at least one part of the at least one object can also be performed using the measurement beam generated via the measurement beam source, as described before.

The irradiation device may further be adapted to guide the energy beam to at least two positions on the carrying element, in particular the irradiation device may be adapted to guide the energy beam over the entire carrying element, or the measurement beam source may be adapted to guide the measurement beam to at least two positions on the carrying element, in particular the measurement beam source may be adapted to guide the measurement beam over the entire carrying element. As described before, the term "carrying element" may refer to any structure on which the at least one part of the at least one object is positioned/arranged, for example a (height adjustable) carrying element that carries the at least one object and non-consolidated build material in the additive manufacturing process. It is also possible that the term "carrying element" refers to a surface on which the at least one part of the at least one object is positioned, wherein build material is depleted around the object and/or onto the object (e.g. from above). Of course, it is also possible to guide the energy beam or the measurement beam via a beam guiding unit. The beam guiding unit may be separate to the irradiation device or the measurement beam source or may be deemed as component of the irradiation device or the measurement beam source.

The energy beam and/or the measurement beam may be guided over the carrying element (or over the build plane), in particular scanned over the carrying element/build plane. By scanning the energy beam and/or the measurement beam over the carrying element (or the build plane) the energy beam and/or the measurement beam will be guided (continuously) over regions in which the energy beam and/or the measurement beam is not reflected or reflected differently compared to the energy beam and/or the measurement beam being incident on a region in which the at least one part of the at least one object is positioned. In other words, by scanning the energy beam or the measurement beam over the carrying element or over the build plane it is possible to determine in which position the energy beam on the measurement beam is reflected at the at least one part of the at least one object.

Preferably, the position determination device may be adapted to generate a map of the carrying element or the build plane comprising position data of the at least one part of the at least one object. Thus, a map of the carrying element or of the build plane can be generated, wherein position data are included in the map that relate to the position of the at least one part of the at least one object. It can preferably be derived from the map in which positions of the carrying element or the build plane the at least one part of the at least one object is positioned. Thus, a relative position of the at least one object on the carrying element or on the build plane can be derived.

For example, the energy beam and/or the measurement beam may be guided in different directions across the build plane, in particular starting from the object (on the object/previously consolidated layer) moving the energy beam over the edge of the object to non-consolidated build material/the object carrier. It is also possible to move the energy beam and/or the measurement beam the other way around, starting on non-consolidated build material or the object carrier, respectively, moving towards the object, preferably over an edge of the object. In both directions it is possible to detect a change in the at least one reflected part of the energy beam/measurement beam.

The inventive apparatus may further be improved in that the position determination device may be adapted to generate a map comprising at least two regions, wherein at least one first region corresponds to a region of the carrying element in which the energy beam or the measurement beam is reflected and at least one second region corresponds to a region in which the energy beam or the measurement beam is not reflected (or reflected with different properties than in the first region, e.g. a lower intensity of the reflected part). Thus, the generated map may comprise at least two regions, wherein one or multiple first regions can be included in the map that indicate the position of the at least one part of the at least one object, as the energy beam or the measurement beam is reflected in the first region. In other words, the first region or the multiple first regions indicate the positions in which the energy beam or the measurement beam was reflected at the at least one part of the at least one object.

Therefore, the first region or the multiple first regions are related to the positions in which the at least one part of the at least one object is arranged on the carrying element or in the build plane. Accordingly, the at least one second region, in particular multiple second regions, can be identified, as the detection element does not detect the reflected part, if the energy beam of the measurement beam is positioned in one of those second regions. The second regions therefore, indicate positions or areas on the carrying element or in the build plane in which no part of an object is arranged. By identifying the first regions and second regions, the map includes the position data of the at least one part of the at least one object.

According to another embodiment of the inventive apparatus, the position determination device may be adapted to determine the position of the at least one object on the carrying element or in the build plane based on the at least one first region. As described before, a first region is determined via the position determination device and may be stored in the map, if a reflected part of the energy beam or the measurement beam is detected in the corresponding position or the corresponding area of the build plane or the carrying element via the detection unit of the position determination device. Thus, the position determination device may assign at least one part of at least one object to each first region in which a reflected part is detected. In other words, the map including the first regions and the second regions comprises the position data, as the first regions may be identical to the position of the at least one part of the at least one object.

The inventive apparatus may further be improved in that the position determination device may be adapted to relate at least one position of the at least one first region with a corresponding spot position of the energy beam or the measurement beam. Therefore, it is possible to relate the actual position of the spot of the energy beam or the measurement beam in the build plane or on the carrying element with the detection result from the detection unit. In other words, it is possible to relate, in particular to store, the actual position of the spot of the energy beam or the measurement beam together with the detection result. Thus, the energy beam or the measurement beam is guided onto the build plane or onto the carrying element, wherein the detection result may be stored for each position in the build plane or on the carrying element, for example stored in the map, as described before. Thus, a direct relation between spot position on the carrying element or in the build plane and the detection result can be established. This allows for determining the positions of the spot on the carrying element or in the build plane in which a reflected part of the energy beam or the measurement beam is detected. Hence, a direct relation between the spot position on the carrying element or in the build plane and the position of the at least one part of the at least one object can be established.

Additionally, the position determination device may be adapted to generate calibration data based on the position of the at least one part of the at least one object, wherein the irradiation device (or a corresponding beam guiding unit separate to or integrated in the irradiation device) may be adapted to guide the energy beam based on the calibration data. Therefore, calibration data can be generated via the position determination device by comparing a nominal position of the at least one part of the at least one object with the determined position data. For example, the energy beam or the measurement beam may be guided on the carrying element or in the build plane and position data may be generated relating to the position of the at least one object. The position data that are generated may be compared with the nominal position data and if a deviation occurs, calibration data can be generated that allow for calibrating the irradiation device. Thus, it is ensured that the irradiation pattern that is generated via the irradiation device, e.g. at least one beam path the energy beam is guided along to selectively irradiate the build material, is positioned in a nominal position, wherein deviations from the nominal position can be compensated using the calibration data.

Further, the irradiation device may be adapted to guide the energy beam in a predefined scan area or the measurement beam source may be adapted to guide the measurement beam in a predefined scan area. According to this embodiment, it is possible that a scan area is predefined in which the energy beam or the measurement beam is guided, for example in the build plane or on the carrying element. Thus, it is not necessary to guide the energy beam or the measurement beam over the entire area of the carrying element or the build plane, but it is possible to restrict the scan area to the predefined scan area. Thus, it is possible to reduce the time that is required for scanning the entire build plane or the entire carrying element, wherein the predefined scan area may be limited on an area in which the at least one part of the at least one object is positioned or in which the nominal position of the at least one part of the at least one object is deemed to be.

According to another embodiment of the inventive apparatus, the position determination device may be adapted to determine the position of the at least one part of the at least one object on a carrying element or in the build plane inside the process chamber of the apparatus during an additive manufacturing process and/or in advance to at least one preparation step for an additive manufacturing process, in particular a hybrid process, preferably in advance to the application of a first layer of build material and/or the first irradiation step. As described before, it is possible to use the position determination device in advance to an additive manufacturing process or during an additive manufacturing process. For example, in hybrid processes it is common to arrange a previously built or provided part of at least one object inside the process chamber of an apparatus and to additively build at least one other part of the object onto the previously built or provided part. Thus, it is possible to arrange said part in the process chamber, for example on a carrying element. The determination device is then adapted to determine the position of the at least one part of the at least one object on the carrying element, as described before.

Alternatively or additionally, it is possible to use the position determination device during an additive manufacturing process, for example a hybrid process or a regular additive manufacturing process. The position determination device may particularly be used to determine the position of at least one consolidated layer, wherein the energy beam or the measurement beam is guided in the build plane, wherein it is determined in which position the reflected part of the energy beam or the measurement beam is detected. As described before, the irradiation device and/or the measurement beam source and/or a beam guiding unit are adapted to guide the energy beam to a previously consolidated layer of build material, wherein the position determination device is adapted to generate position data relating to the position of the previously consolidated layer. Thus, a relation can be established between the positions in which the energy beam or the measurement beam is reflected (at the previously consolidated layer of build material). Thus, during the additive manufacturing process it is ensured that the position of each consolidated layer meets a nominal position, wherein deviations from the nominal position may be compensated, e.g. using calibration data, as described before.

Besides, the invention relates to a position determination device for determining position data for an apparatus for additively manufacturing three-dimensional objects by means of successive layerwise selective irradiation and consolidation of layers of a build material which can be consolidated by means of an energy beam, in particular for an inventive apparatus, as described before, wherein the position determination device is adapted to determine position data relating to a position of at least one part of at least one object based on a detection of a reflected part of the energy beam or a measurement beam that is reflected at the at least one part of the at least one object. The position determination device may be built as an assembly that can be used in an additive manufacturing apparatus, for example integrally arranged in an additive manufacturing apparatus. Thus, the position determination device may be used in advance to or during the additive manufacturing process directly in the process chamber of the additive manufacturing apparatus.

The position determination device may also be used in a separate apparatus or a separate module or station in which position data are determined relating to the position of the at least one part of the at least one object, for example on a carrying element. Thus, it is possible to arrange the at least one part of the at least one object that is carried on the carrying element in a "position determination station" in which the position of the at least one part of the at least one object on the carrying element is determined. Subsequently, the carrying element carrying the at least one part of the at least one object may be arranged inside an additive manufacturing apparatus in which the additive manufacturing process is performed. Of course, the additive manufacturing process may be performed using the position data that have previously been acquired via the "position determination station".

Further, the invention relates to a method for determining position data for at least one apparatus for additively manufacturing three-dimensional objects by means of successive layerwise selective irradiation and consolidation of layers of a build material which can be consolidated by means of an energy source, in particular an inventive apparatus, as described before, wherein position data relating to a position of at least one part of at least one object are determined based on a detection of a reflected part of an energy beam or a measurement beam that is reflected at the at least one part of the at least one object.

Self-evidently, all features, details and advantages described with respect to the inventive apparatus are transferable to the inventive position determination device and the inventive method and vice versa. In particular, the inventive method may be performed on an inventive apparatus and/or using an inventive position determination device. The position data acquired via the inventive method may be used in an additive manufacturing process, for example performed via an inventive apparatus.

Figure 2:
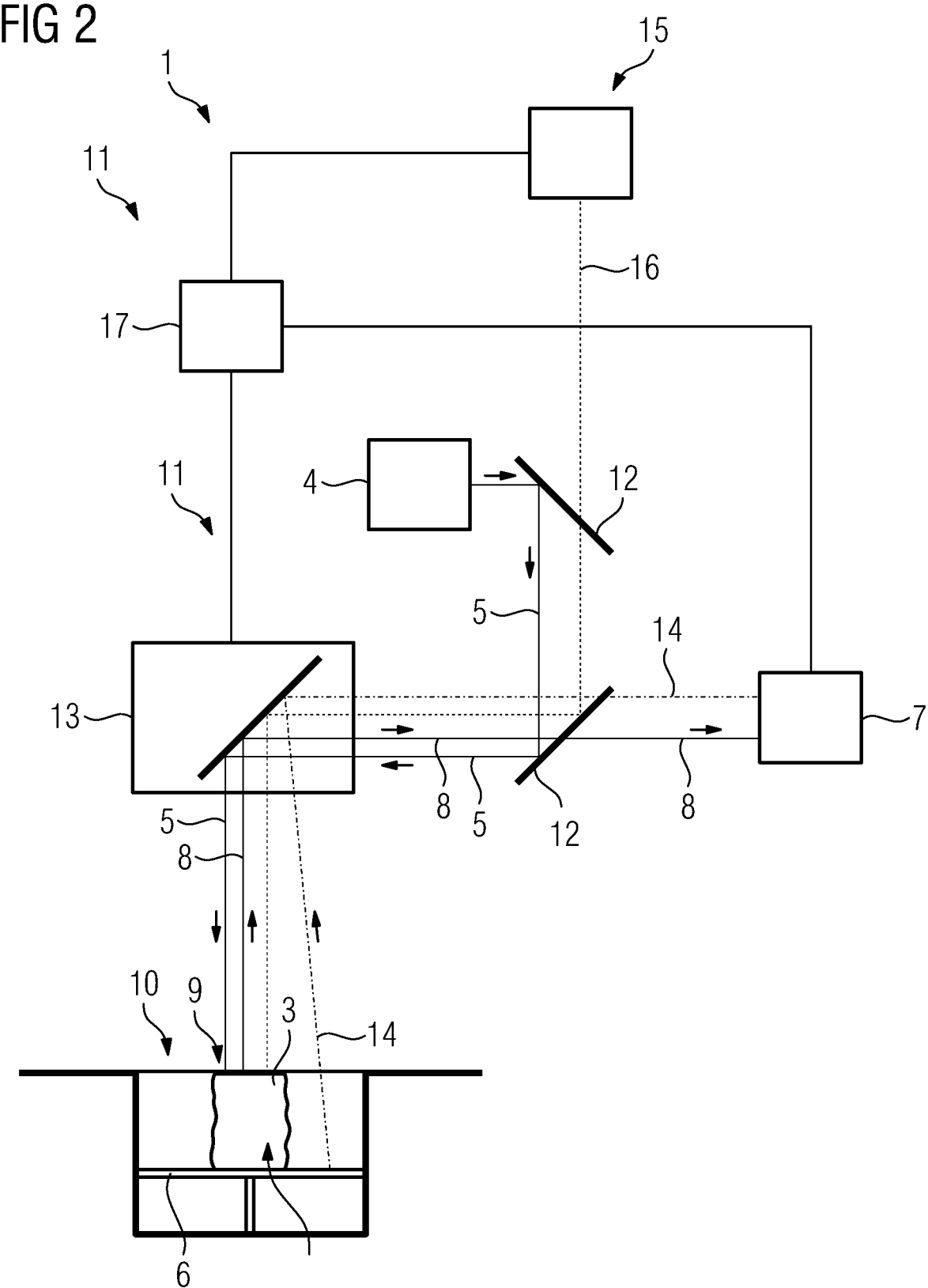
Figure 3:
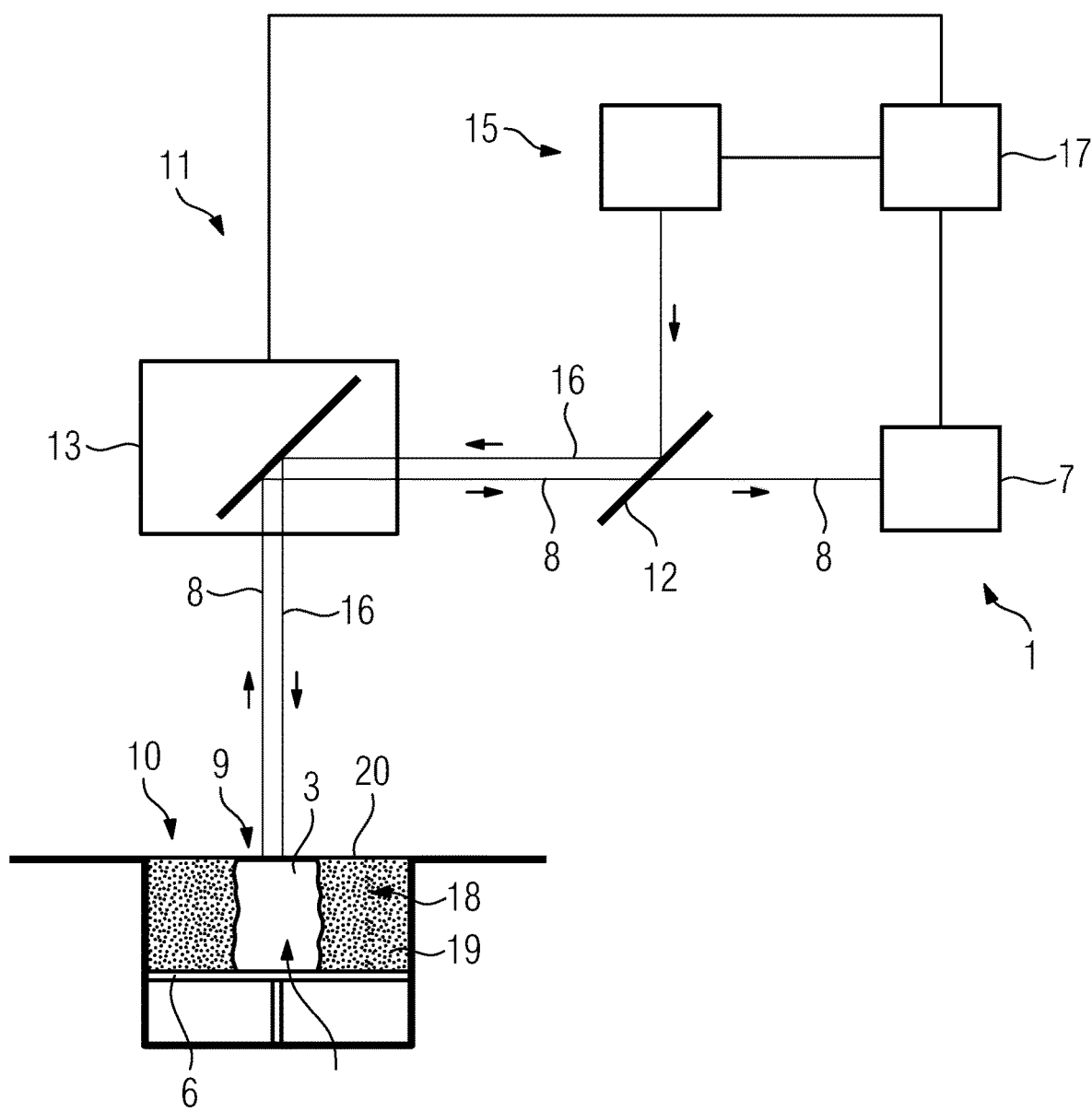

Exemplary embodiments of the invention are described with reference to the FIG. The FIG. are schematic diagrams, wherein FIG. 1 shows an inventive position determination device according to a first embodiment;

FIG. 2 shows an inventive apparatus with an inventive position determination device according to a second embodiment; and FIG. 3 shows an inventive apparatus with an inventive position determination device according to a third embodiment.

FIG. 1 shows a position determination device 1 for determining position data, for example for an apparatus 11 for additively manufacturing of three-dimensional objects 2 (FIG. 2, FIG. 3). The position determination device 1 is adapted to determine position data relating to a position of at least one part 3 of at least one three-dimensional object 2. The position determination device 1 comprises a measurement beam source 4 that is adapted to generate a measurement beam 5. The measurement beam source 4 according to this exemplary embodiment is adapted to generate and guide the measurement beam 5 over a carrying element 6 that carries the at least one part 3 of the at least one object 2. Of course, it is also possible to provide a separate beam guiding unit (not shown) to guide the measurement beam 5.

The position determination device 1 further comprises a detection unit 7 that is adapted to detect a reflected part 8 of the measurement beam 5, which is reflected at the at least one part 3 of the at least one object 2. In other words, the measurement beam 5 may be scanned over the carrying element 6 on which the at least one part 3 of the at least one object 2 is arranged. Dependent on whether the measurement beam 5 is incident on the at least one part 3, a reflected part 8 of the measurement beam 5 is reflected at the part 3 and can be detected via the detection unit 7. If the measurement beam 5 is reflected at a structure surrounding the part 3, e.g. the carrying element 6, the reflected radiation will differ, as, for example, the reflectivity of the part 3 and the carrying element 6 differ. Further, the focal position of the measurement beam 5 may be adjusted to lie in the uppermost surface of the part 3. Thus, the intensity of the reflected part 8 reflected at the part 3 and a reflection on any other surface can be distinguished.

The detection unit 7 may comprise at least one detection element, such as a photo diode or a camera (CCD, CMOS). It is particularly possible to guide the measurement beam 5 to different positions on the carrying element 6, wherein a map can be generated comprising at least two different regions, for example a first region 9 and at least one second region 10. In the first region 9 the measurement beam 5 is incident on the at least one part 3 and therefore, the reflected part 8 of the measurement beam 5 can be detected via the detection unit 7.

If the measurement beam 5 is incident in the second region 10, the measurement beam 5 is not reflected at the part 3. Thus, via the detection unit 7 and therefore, via the position determination device 1 it is possible to determine, whether the measurement beam 5 is incident on the at least one part 3 and in which actual position of the measurement beam 5 the measurement beam 5 is incident on the at least one part 3. Thus, the map may include position data of the at least one part 3 on the carrying element 6. Hence, a direct relation between the detection of the reflected part 8 of the measurement beam 5 and the position of the at least one part 3 of the at least one object 2 can be established and therefore, position data may be generated that can afterwards be used in an additive manufacturing process in which the carrying element 6 carries the at least one part 3.

As the position data indicate the position of the at least one part 3 relative to the carrying element 6 it is possible to control an additive manufacturing apparatus, in particular the generation of an irradiation pattern or the guiding of at least one energy beam used to irradiate build material based on the position data.

FIG. 2 shows an apparatus 11 for additively manufacturing of three-dimensional objects 2 comprising a position determination device 1 according to a second embodiment. Again, the position determination device 1 comprises a measurement beam source 4 that is adapted to generate a measurement beam 5. The measurement beam 5 may be guided onto the at least one part 3 of at least one object 2 via the beam guiding elements 12, in particular beam splitters. In this exemplary embodiment the generated measurement beam 5 is guided via two beam guiding elements 12 to a beam guiding unit 13 that is adapted to scan the measurement beam 5 over the carrying element 6 or in a build plane (not shown). The reflected part 8 of the measurement beam 5 reflected at the uppermost surface of the part 3 is reflected and guided back towards the beam guiding unit 13, wherein the reflected part 8 passes the first of the two beam guiding elements 12 and is incident on the detection unit 7.

As the reflectivity of the at least one part 3 differs from the reflectivity of the carrying element 6, the detection unit 7 is adapted to distinguish between a reflected part 8 that is reflected at the at least one part 3 and a reflected part 14 that is reflected at the carrying element 6. Thus, as described before, the map can be generated comprising at least one first region 9 and at least one second region 10, wherein the first region 9 indicates the position of the at least one part 3 on the carrying element 6.

The apparatus 11 further comprises an irradiation device 15 that is adapted to generate an energy beam 16 that can be guided into the process chamber, in particular scanned over a build plane, for example the uppermost layer of a powder bed carried via the carrying element 6 (not shown, cf. FIG. 3). In this exemplary embodiment the energy beam 16 is exclusively used to selectively irradiate build material and thereby additively layerwise build another part onto the at least one part 3, for example in a hybrid additive manufacturing process. Due to the arrangement of the beam guiding elements 12 and the beam guiding unit 13, the energy beam 16 can be guided in line with the measurement beam 5. The measurement beam 5 and the energy beam 16 may, for example, be laser beams, wherein the energy beam 16 and the measurement beam 5 may differ for example in the wavelength and/or in the intensity.

With the set up in this exemplary embodiment it is particularly possible to use the position determination device 1 in advance to an additive manufacturing process or during an additive manufacturing process, wherein each layer of build material that has been consolidated via the energy beam 16 can be measured, as described before. In particular, it is possible to use the measurement beam 5 in that the measurement beam 5 can be scanned over the build plane, wherein a first region 9 is determined for the previously consolidated layer, as the reflectivity of the previously consolidated layer differs from the reflectivity of non-consolidated build material surrounding the previously built layer.

Thus, it is possible that the position determination device 1 generates calibration data, wherein a control unit 17 is provided that is adapted to calibrate the beam guiding unit 13 and/or the irradiation device 15 based on the position data and/or the calibration data, for example received from the detection unit 7. Of course, the beam guiding unit 13 can be deemed as comprised in the irradiation device 15.

FIG. 3 shows an apparatus 11 with a position determination device 1 according to a third embodiment. Deviant from the apparatus 11 depicted in FIG. 2 or the position determination device 1 depicted in FIG. 1, the apparatus 11 in the exemplary embodiment depicted in FIG. 3 does not comprise a separate measurement beam source 4. Instead, the energy beam 16 generated via the irradiation device 15, for example generated via a laser source, is used to determine the position data relating to the position of the at least one part 3 of the at least one object 2. Although, the at least one part 3 is comprised in a powder bed 18 of non-consolidated build material 19, it is also possible to determine position data relating to the position of the at least one part 3 with only the at least one part 3 being arranged on the carrying element 6, as described before, with respect to FIG. 1, FIG. 2. Thus, it is possible to use the apparatus 11, as depicted in FIG. 3, in advance to an additive manufacturing process to generate or determine position data relating to the position of the at least one part 3 of the at least one object to on the carrying element 6 and it is also possible to use the determination device of the apparatus 11, as depicted in FIG. 3 during an additive manufacturing process, as also described before.

To determine the position data, the irradiation device 15 generates an energy beam 16, preferably in a "measurement mode", wherein the energy beam 16 is generated with an intensity that is lower than an intensity used in a regular additive manufacturing process. In particular, a determination intensity or a measurement intensity may be used that is below a predefined threshold value. In particular, the determination intensity of the energy beam 16 is not sufficient to heat the build material 19 arranged in the build plane 20 or the at least one part 3, in particular to consolidate, e.g. a sinter or melt the build material 19 or the at least one part 3.

The generated energy beam 16 is guided via a beam guiding element 12 to the beam guiding unit 13 that is adapted to scan the energy beam 16 over the build plane 20 or over the carrying element 6, respectively. A reflected part 8 of the energy beam 16 is reflected in a first region 9 in which the at least one part 3 is arranged. The reflected part 8 of the energy beam 16 is reflected towards the beam guiding unit 13 and therefore, reflected back to the beam guiding element 12 which is passed by the reflected part 8 of the energy beam 16 and therefore, incident on the detection unit 7. Analogously to the position determination devices 1 depicted in FIG. 1, 2, the detection unit 7 is adapted to distinguish between the first region 9 in which the at least one part 3 is arranged and at least one second region 10 in which non-consolidated build material or the carrying element 6 is arranged.

Therefore, it is possible to determine position data of the at least one part 3 of the at least one object 2 on the carrying element 6 in advance to the additive manufacturing process, in particular a hybrid process. Also, it is possible to determine the position of at least one consolidated layer of build material 19 that has been consolidated via the energy beam 16 in an "irradiation mode" in which the energy beam 16 is generated via the irradiation device 15 with a comparatively higher intensity, in particular an intensity that is sufficient to heat the build material 19, e.g. to melt or sinter, and consolidate the build material 19 to form the at least one part 3 or another part of the at least one object 2 on top of the at least one part 3, for instance.

By determining the position data relating to the position of the previously applied layer of build material 19 it is possible to generate calibration data by comparing the actual position of the lastly applied layer of build material and comparing the position with a nominal position for the corresponding layer. If deviations between the nominal position and the actual determined position occur, calibration data can be generated, for example via the control unit 17 that is adapted to calibrate the beam guiding unit 13 or the irradiation device 15, respectively. Thus, the actual position in which an irradiation pattern is generated, i.e. comprising at least one energy beam path the energy beam 16 is guided along, can be calibrated in that the nominal position of the irradiation pattern is met.

Of course, the inventive method can be performed on the inventive apparatuses 11, preferably using an inventive position determination device 1, as described before. Self-evidently, all details, features and advantages described with respect to the individual embodiments depicted in the FIGS. 1-3 are fully transferable and exchangeable.

The invention claimed is:

1. A method for determining position data for at least one apparatus for additively manufacturing three-dimensional objects by successive layerwise selective irradiation and consolidation of layers of a build material which can be consolidated by an energy source, the method comprising:
  generating a first energy beam, via the energy source at a first intensity, for determining position data;
  scanning the first energy beam over a carrier to at least one part of at least one object, wherein the at least one object is arranged on the carrier;
  detecting a reflected part of the first energy beam that reflects off the at least one part of the at least one object and a second reflected part of the first energy beam that reflects off at least one part of the carrier;
  determining position data relating to a position of the at least one part of the at least one object relative to the carrier based at least on comparing a difference in reflectivity between the reflected part of the first energy beam and the second reflected part of the first energy beam;
  generating a second energy beam, via the energy source at a second intensity greater than the first intensity; and
  scanning the second energy beam onto the build material to consolidate the build material.

2. The method of claim 1, wherein detecting the reflected part of the first energy beam comprises detecting the reflected part of the first energy beam a via a detection unit comprising a photo diode and/or a camera.

3. The method of claim 1, wherein generating the first energy beam for determining the position data comprises generating the first energy beam having at least two different irradiation parameters than the second energy beam for selectively irradiating the build material.

4. The method of claim 3, wherein the at least two different irradiation parameters comprise different wavelengths and/or focal positions and/or beam powers and/or spot sizes and/or scan speeds.

5. The method of claim 1, further comprising guiding the first energy beam to at least two positions on a build plane.

6. The method of claim 1, further comprising generating a map of a build plane comprising the position data.

7. The method of claim 6, wherein generating the map comprises generating at least two regions, wherein at least one first region corresponds to a region of the build plane in which the first energy beam is reflected and at least one second region corresponds to a region in which the first energy beam is not reflected at the at least one part of the at least one object.

8. The method of claim 1, further comprising generating calibration data based on the position data, and guiding the second energy beam based on the calibration data.

9. The method of claim 1, further comprising guiding the first energy beam in a predefined scan area.

10. The method of claim 1, wherein determining the position data is performed during additive manufacturing of the three-dimensional objects.

11. The method of claim 1, further comprising guiding the first energy beam to a previously consolidated layer of build material, and wherein the at least one part of the at least one object is in the previously consolidated layer of build material.

\* \* \* \* \*

UNITED STATES PATENT AND TRADEMARK OFFICE
CERTIFICATE OF CORRECTION

PATENT NO. : 12,384,106 B2
APPLICATION NO. : 16/290961
DATED : August 12, 2025
INVENTOR(S) : Tim Klaußner Page 1 of 1

It is certified that error appears in the above-identified patent and that said Letters Patent is hereby corrected as shown below:

In the Claims

Claim 2, Column 14, Line 11, change "reflected part of the first energy beam a via a detection unit" to --reflected part of the first energy beam via a detection unit--.

Signed and Sealed this
Twenty-eighth Day of October, 2025

John A. Squires
*Director of the United States Patent and Trademark Office*